United States Patent
Sakuma et al.

(10) Patent No.: US 9,828,491 B2
(45) Date of Patent: Nov. 28, 2017

(54) POLYAMIDE RESIN COMPOSITION AND MOLDED ARTICLE

(71) Applicant: ASAHI KASEI CHEMICALS CORPORATION, Tokyo (JP)

(72) Inventors: Teruaki Sakuma, Tokyo (JP); Kazunori Terada, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/972,823

(22) Filed: Dec. 17, 2015

(65) Prior Publication Data

US 2016/0177058 A1 Jun. 23, 2016

(30) Foreign Application Priority Data

Dec. 18, 2014 (JP) ................................. 2014-256595

(51) Int. Cl.

| | |
|---|---|
| C08L 77/00 | (2006.01) |
| C08K 3/10 | (2006.01) |
| C08K 3/16 | (2006.01) |
| C08K 5/09 | (2006.01) |
| C08K 5/10 | (2006.01) |
| C08K 5/524 | (2006.01) |
| C08K 5/527 | (2006.01) |
| C08K 5/5357 | (2006.01) |
| C08K 5/098 | (2006.01) |
| C08K 5/20 | (2006.01) |
| C08K 5/5333 | (2006.01) |
| C08L 77/06 | (2006.01) |

(52) U.S. Cl.
CPC ................ *C08K 5/527* (2013.01); *C08K 3/16* (2013.01); *C08K 5/09* (2013.01); *C08K 5/098* (2013.01); *C08K 5/20* (2013.01); *C08K 5/524* (2013.01); *C08K 5/5333* (2013.01); *C08K 5/5357* (2013.01); *C08L 77/06* (2013.01); C08K 2003/162 (2013.01); C08K 2003/166 (2013.01)

(58) Field of Classification Search
None
See application file for complete search history.

(56) References Cited

U.S. PATENT DOCUMENTS

| | | | |
|---|---|---|---|
| 5,929,178 A | 7/1999 | Shida et al. | |
| 2003/0004248 A1* | 1/2003 | Wakamura | C08K 3/34 524/441 |
| 2004/0242757 A1* | 12/2004 | Ulrich | B29C 65/1635 524/514 |
| 2009/0105392 A1* | 4/2009 | Yamauchi | C08J 5/043 524/494 |
| 2009/0281210 A1* | 11/2009 | Aramaki | C08J 3/226 523/351 |
| 2011/0039993 A1 | 2/2011 | Peduto et al. | |
| 2013/0165567 A1* | 6/2013 | Benighaus | C08K 5/0008 524/210 |

FOREIGN PATENT DOCUMENTS

| | | |
|---|---|---|
| JP | H07-018176 A | 1/1995 |
| JP | 2011-511097 A | 4/2011 |
| WO | 2013-143858 A1 | 10/2013 |

* cited by examiner

*Primary Examiner* — Christopher M Rodd
(74) *Attorney, Agent, or Firm* — Greenblum & Bernstein, P.L.C.

(57) ABSTRACT

A polyamide resin composition comprising a polyamide resin (A), a copper compound (B), a bromide of an alkali metal and/or a bromide of an alkaline earth metal (C), and at least one phosphorus compound (D) selected from the group consisting of tris(2,4-di-t-butylphenyl)phosphite, bis(2,4-di-t-butylphenyl)pentaerythritol diphosphite, bis(2,6-di-t-butyl-4-methylphenyl)pentaerythritol diphosphite, bis(2,4-dicumylphenyl)pentaerythritol diphosphite, 2,2',2"-nitrilo(triethyl-tris(3,3',5,5'-tetra-t-butyl-1,1'-biphenyl-2,2'-diyl))phosphite, tetrakis(2,4-di-t-butylphenyl)-4,4'-biphenylene diphosphonite, tetrakis(2,4-di-t-butylphenyl)-4,3'-biphenylene diphosphonite, and tetrakis(2,4-di-t-butylphenyl)-3,3'-biphenylene diphosphonate, in an amount of 0.01 to 10% by mass with respect to 100% by mass of the polyamide resin composition, at least one fatty acid compound (E), and an inorganic filler (F).

11 Claims, No Drawings

POLYAMIDE RESIN COMPOSITION AND MOLDED ARTICLE

TECHNICAL FIELD

The present invention relates to a polyamide resin composition and a molded article.

DESCRIPTION OF THE RELATED ART

Polyamide resins have high mechanical properties (such as mechanical strength, rigidity, and impact resistance, etc.), toughness, heat resistance, and chemical resistance. The polyamide resins have been used in various industrial fields such as clothing, industrial materials, automobiles, electric and electronic industries and other industrial fields.

In particular, the polyamide resins have higher heat aging resistance than that of other resins. The polyamide resins are therefore suitably used as materials for parts which receive a significantly large amount of heat, such as parts for engine compartments of vehicles.

The environmental temperatures inside the engine compartments of vehicles have been increased recently in connection with higher density of parts for engine compartments of vehicles and higher outputs of engines. For this reason, a polyamide resin which can maintain significantly higher heat aging resistance for a longer period of time than those of the traditional polyamide resins has been required.

One of the traditional techniques of enhancing the heat aging resistance of the polyamide resins is addition of a copper compound (oxide or salt of copper) and a halogen compound.

Among the halogen compounds, an iodine compound is generally added. A technique of compounding a polyamide resin, a copper compound, an iodine compound, and an aliphatic carboxylic derivative is known (for example, see patent literature 1).

However, iodine as a resource is mined from the ground, and its efficient mining areas are limited. For this reason, the price of iodine compounds has been rising in recent years. Thus, use of iodine compounds in polyamide resins has a problem of increased production cost.

In contrast, bromine as a resource can be extracted from sea water or the like, and is more inexpensive and industrially useful than iodine. Other techniques of adding a bromine compound rather than an iodine compound have been developed to enhance the heat aging resistance of the polyamide resin (for example, see patent literature 2 and 3).

CITATION LIST

Patent Literature

[Patent literature 1] Japanese Patent Laid-Open No. 7-18176
[Patent literature 2] International publication (WO) No. 2013-143858
[Patent literature 3] National Publication of International Patent Application No. 2011-511097

SUMMARY OF THE INVENTION

Technical Problem

Bromine compounds, however, are more likely to cause metal corrosion than iodine compounds. Furthermore, if polyamide resin compositions containing a bromine compound are used as materials for parts for engine compartments of vehicles and the like, there is a concern that the bromine compound may corrode metallic parts of processing machines such as extruders and molding machines. For example, conditions under which such a polyamide composition containing a bromine compound should be considered. Accordingly, the development of a polyamide resin composition which causes less corrosion of metal than before has been required.

An object of the present invention is to provide a polyamide resin composition which has high heat aging resistance, and is less likely to cause corrosion of metal and deposition of copper.

Solution to Problem

The present inventors, who have conducted extensive research to solve the problems, have found that the problems can be solved by a polyamide resin composition comprising a polyamide resin, a copper compound, a specified bromide, and a specified phosphorus compound.

Specifically, the present invention is as follows:

[1]
A polyamide resin composition comprising
a polyamide resin (A),
a copper compound (B),
a bromide of an alkali metal and/or a bromide of an alkaline earth metal (C), and
at least one phosphorus compound (D) selected from the group consisting of phosphite compounds represented by the following general formula (1) and phosphonite compounds represented by the following general formula (2):

$$\text{phosphite compound: } (RO)_m P(OH)_{3-m} \quad \text{general formula (1) and}$$

$$\text{phosphonite compound: } (RO)_n P(OH)_{2-n}(R) \quad \text{general formula (2)}$$

wherein m represents 1, 2, or 3; n represents 1 or 2; R represents an aliphatic group, an aromatic group, or a partially substituted aliphatic group or aromatic group; and if each of m and n is 2 or more, a plurality of (RO) groups in the general formulas (1) and (2) are the same or different from each other.

[2]
The polyamide resin composition according to [1], wherein the copper compound (B) is a copper halide compound.

[3]
The polyamide resin composition according to [1] or [2], wherein a molar ratio of a halogen element/a copper element, in the polyamide resin composition is 2/1 to 50/1.

[4]
The polyamide resin composition according to any one of [1] to [3], further comprising at least one fatty acid compound (E) selected from the group consisting of fatty acid esters, fatty acid amides, and fatty acid metal salts.

[5]
The polyamide resin composition according to [4], wherein the fatty acid compound (E) has an acid value of 10 mg/g or less.

[6]
The polyamide resin composition according to [4] or [5], wherein the fatty acid compound (E) is a higher fatty acid metal salt with a metal content of 3.5 to 11.5% by mass.

[7]
The polyamide resin composition according to any one of [1] to [6], wherein the content of the copper element in the polyamide resin composition is 0.005% by mass or more with respect to the total mass of the polyamide resin composition.

[8]
The polyamide resin composition according to any one of [1] to [7], wherein the mass ratio [x/y] of the bromide of an alkali metal and/or bromide of an alkaline earth metal (C) [x] to the phosphorus compound (D) [y] is 100/1 to 1/100.

[9]
The polyamide resin composition according to any one of [1] to [8], further comprising an inorganic filler (F).

[10]
The polyamide resin composition according to any one of [1] to [9], wherein a copper element is not deposited on the surface of a rolled steel (SS400) after the polyamide resin composition is in contact with the rolled steel at a temperature 30° C. higher than the melting point of the polyamide resin (A) for 12 hours.

[11]
A molded article comprising a polyamide resin composition according to any one of [1] to [10].

[12]
The molded article according to [11], wherein the molded article is a vehicle part.

Advantageous Effect of the Invention

According to the present invention, a polyamide resin composition that is high heat aging resistance and exhibits suppressed metal corrosive properties and copper-depositing properties can be obtained.

Embodiments of the Invention

Hereinafter, an embodiment for carrying out the present invention (hereinafter, referred to as the "present embodiment") will be described in detail.

The present embodiment described below is only an example for describing the present invention. The present invention will not be limited to the embodiment, and can be modified in various ways within the gist and implemented.

[Polyamide Resin Composition]

The polyamide resin composition according to the present embodiment comprises:

a polyamide resin (A), a copper compound (B), a bromide of an alkali metal and/or a bromide of an alkaline earth metal (C), and at least one phosphorus compound (D) selected from the group consisting of phosphite compounds represented by the following general formula (1) and phosphonite compounds represented by the following general formula (2):

phosphite compound: $(RO)_mP(OH)_{3-m}$   general formula (1) and phosphonite compound: $(RO)_nP(OH)_{2-n}(R)$   general formula (2)

wherein m represents 1, 2, or 3; n represents 1 or 2; R represents an aliphatic group, an aromatic group, or a partially substituted aliphatic group or aromatic group; and if each of m and n is 2 or more, a plurality of (RO) groups in the general formulas (1) and (2) are the same or different from each other.

Hereinafter, each component of the polyamide resin composition according to the present embodiment will be described in detail.

(Polyamide Resin (A))

The polyamide resin composition according to the present embodiment contains a polyamide resin (A) (hereinafter, also referred to as a component (A)). The polyamide resin indicates a polymer having a —CO—NH— bond (amide bond) in the main chain.

Examples of the polyamide resin (A) include, but are not limited to, a polyamide resin obtained by the ring-opening polymerization of a lactam, a polyamide resin obtained by the self-condensation of a ω-aminocarboxylic acid, a polyamide resin obtained by the condensation of a diamine and a dicarboxylic acid, and copolymers thereof.

These polyamide resins can be used singly, or can be used in combination in the form of a mixture.

Hereinafter, the raw materials for the polyamide resin (A) will be described.

Examples of the lactam as a monomer, which is a component of the polyamide resin, include, but are not limited to, pyrrolidone, caprolactam, undecalactam, and dodecalactam.

Examples of the ω-aminocarboxylic acid include, but are not limited to, ω-amino fatty acids, which are ring-opened compounds of the lactams with water. These lactams or ω-aminocarboxylic acids each can be used singly or can be used in combination of two or more thereof.

Next, the polyamide resin obtained by the condensation of a diamine and a dicarboxylic acid will be described.

First, examples of the diamine (monomer) include, but are not limited to, linear aliphatic diamines such as hexamethylenediamine and pentamethylenediamine; branched aliphatic diamines such as 2-methylpentanediamine and 2-ethylhexamethylenediamine; aromatic diamines such as p-phenylenediamine and m-phenylenediamine; and alicyclic diamines such as cyclohexanediamine, cyclopentanediamine, and cyclooctanediamine.

Examples of the dicarboxylic acid (monomer) include, but are not limited to, aliphatic dicarboxylic acids such as adipic acid, pimelic acid, and sebacic acid; aromatic dicarboxylic acids such as phthalic acid and isophthalic acid; and alicyclic dicarboxylic acids such as cyclohexanedicarboxylic acid.

These diamines or dicarboxylic acids as a monomer each can be used singly or can be used in combination of two or more thereof.

Examples of the polyamide resin (A) include, but are not limited to, polyamide 4 (poly-α-pyrrolidone), polyamide 6 (polycaproamide), polyamide 11 (polyundecanamide), polyamide 12 (polydodecanamide), polyamide 46 (polytetramethylene adipamide), polyamide 66 (polyhexamethylene adipamide), polyamide 610, polyamide 612, polyamide 6T (polyhexamethylene terephthalamide), polyamide 9T (polynonamethylene terephthalamide), and polyamide 6I (polyhexamethylene isophthalamide), and copolymerized polyamides containing these polyamides as a component.

These polyamide resins each can be used singly or can be used in combination of two or more thereof.

Among the polyamide resins listed above, more preferred are polyamide resins having a melting point of 200° C. or more to enhance the heat resistance.

Examples of the polyamide resin having a melting point of 200° C. or more include, but are not limited to, at least one polyamide resin selected from the group consisting of polyamide 6, polyamide 66, polyamide 610, polyamide 612, polyamide 46, polyamide 6T, polyamide 6I, and polyamide 9T, and copolymerized polyamides containing these polyamides as a component.

The melting point of the polyamide resin indicates a melting point determined by differential scanning calorimetry (DSC) in accordance with JIS K7121.

The ratio of the number of carbon atoms to the number of nitrogen atoms (ratio C/N) in the polymer chain of the polyamide resin (A) is preferably more than 5 from the viewpoint of heat aging resistance. The ratio of the number of carbon atoms to the number of nitrogen atoms (ratio C/N) is more preferably more than 5 and 15 or less, more preferably more than 5 and 12 or less.

Examples of the polyamide resin which is a copolymer include, but are not limited to, at least one copolymer selected from the group consisting of a copolymer of hexamethylene adipamide and hexamethylene terephthalamide, a copolymer of hexamethylene adipamide and hexamethylene isophthalamide, and a copolymer of hexamethylene terephthalamide and 2-methylpentanediamine terephthalamide.

The polyamide resin (A) typically has an amino group or a carboxyl group as terminal groups. The content ratio of the terminal groups in the polyamide resin (A), i.e., content of amino group/content of carboxyl group is preferably 9/1 to 1/9, more preferably 6/4 to 1/9, still more preferably 5/5 to 1/9. A content ratio of the terminal groups within this range tends to be able to more significantly enhance the mechanical strength of the polyamide resin composition according to the present embodiment.

The content of the terminal amino group in the polyamide resin (A) is preferably 10 to 100 µmol/g, more preferably 15 to 80 µmol/g, still more preferably 30 to 80 µmol/g. A content of the terminal amino group in the polyamide resin (A) within this range tends to be able to more significantly enhance the mechanical strength of the polyamide resin composition according to the present embodiment.

The content of the terminal carboxyl group in the polyamide resin (A) is preferably 20 µmol/g or more, more preferably 50 µmol/g or more, further preferably 50 to 120 µmol/g, still further preferably 50 to 100 µmol/g.

A content of the terminal carboxyl group in the polyamide resin (A) within this range tends to be able to more significantly enhance the heat aging resistance of the polyamide resin composition according to the present embodiment.

Throughout the specification, the contents of the terminal amino group and the terminal carboxyl group in the polyamide resin (A) can be determined from the integrated values of characteristic signals corresponding to the respective terminal groups, which are obtained by $^1$H-NMR.

The contents of the terminal groups in the polyamide resin (A) can be adjusted by known methods. Examples of such methods of adjusting the contents of the terminal groups include, but not limited to, a method using a terminal adjuster.

Specifically, the contents of the terminal groups in the polyamide resin (A) can be adjusted through addition of one or more compounds selected from the group consisting of monoamine compounds, diamine compounds, monocarboxylic acid compounds, and dicarboxylic acid compounds during polymerization of the polyamide resin so as to attain predetermined contents of the terminal groups.

These compounds, if functioning as a terminal adjuster, can be added to the polymerization solvent at any timing, for example, at a timing where the raw materials for the polyamide resin (A) are added to the polymerization solvent.

Examples of the monoamine compounds include, but are not limited to, aliphatic monoamines such as methylamine, ethylamine, propylamine, butylamine, hexylamine, octylamine, decylamine, stearylamine, dimethylamine, diethylamine, dipropylamine, and dibutylamine; alicyclic monoamines such as cyclohexylamine and dicyclohexylamine; aromatic monoamines such as aniline, toluidine, diphenylamine, and naphthylamine; and any mixtures thereof.

These monoamine compounds each can be used singly or can be used in combination of two or more thereof.

Among these monoamine compounds, at least one compound selected from the group consisting of butylamine, hexylamine, octylamine, decylamine, stearylamine, cyclohexylamine, and aniline is particularly preferred from the viewpoint of reactivity, boiling point, stability of terminal groups, and price, etc.

Examples of the diamine compounds include, but are not limited to, linear aliphatic diamines such as hexamethylenediamine and pentamethylenediamine; branched aliphatic diamines such as 2-methylpentanediamine and 2-ethylhexamethylenediamine; aromatic diamines such as p-phenylenediamine and m-phenylenediamine; and alicyclic diamines such as cyclohexanediamine, cyclopentanediamine, and cyclooctanediamine.

These diamine compounds each can be used singly or can be used in combination of two or more thereof.

Examples of the monocarboxylic acid compounds include, but are not limited to, aliphatic monocarboxylic acids such as acetic acid, propionic acid, butyric acid, valeric acid, caproic acid, capric acid, lauric acid, tridecylic acid, myristic acid, palmitic acid, stearic acid, pivalic acid, and isobutyric acid; alicyclic monocarboxylic acids such as cyclohexanecarboxylic acid; and aromatic monocarboxylic acids such as benzoic acid, toluic acid, α-naphthalenecarboxylic acid, β-naphthalenecarboxylic acid, methylnaphthalenecarboxylic acid, and phenylacetic acid.

These carboxylic acid compounds each can be used singly or can be used in combination of two or more thereof.

Examples of the dicarboxylic acid compounds include, but are not limited to, aliphatic dicarboxylic acids such as malonic acid, dimethylmalonic acid, succinic acid, glutaric acid, adipic acid, 2-methyladipic acid, trimethyladipic acid, pimelic acid, 2,2-dimethylglutaric acid, 3,3-diethylsuccinic acid, azelaic acid, sebacic acid, and suberic acid; alicyclic dicarboxylic acids such as 1,3-cyclopentanedicarboxylic acid and 1,4-cyclohexanedicarboxylic acid; and aromatic dicarboxylic acids such as isophthalic acid, 2,6-naphthalenedicarboxylic acid, 2,7-naphthalenedicarboxylic acid, 1,4-naphthalenedicarboxylic acid, 1,4-phenylenedioxydiacetic acid, 1,3-phenylenedioxydiacetic acid, diphenic acid, diphenylmethane-4,4'-dicarboxylic acid, diphenylsulfone-4,4'-dicarboxylic acid, and 4,4'-biphenyldicarboxylic acid.

These dicarboxylic acid compounds each can be used singly or can be used in combination of two or more thereof.

The content of the polyamide resin (A) in the polyamide resin composition according to the present embodiment is preferably 30 to 99.94% by mass, more preferably 40 to 99.94% by mass, more preferably 40 to 99.86% by mass, with respect to the total mass of the composition from the viewpoint of enhancing the molding properties and the mechanical strength.

(Copper Compound (B))

The polyamide resin composition according to the present embodiment contains a copper compound (B) (hereinafter, also referred to as a component (B)).

Examples of the copper compound (B) include, but not limited to, copper halides (such as copper iodide, cuprous bromide, cupric bromide, and cuprous chloride), copper acetate, copper propionate, copper benzoate, copper adipate, copper terephthalate, copper isophthalate, copper salicylate, copper nicotinate, copper stearate, and copper complex salts having copper coordinated with a chelating agent such as ethylenediamine or ethylenediaminetetraacetic acid.

These copper compounds each can be used singly or can be used in combination of two or more thereof.

Among the copper compounds (B) listed above, at least one compound selected from the group consisting of copper halides (such as copper iodide, cuprous bromide, cupric bromide, and cuprous chloride) and copper acetate, more preferred are copper halides, and still more preferred are copper iodide and/or cuprous bromide. Use of these copper compounds tends to attain a polyamide resin composition which has high heat aging resistance and is less likely to cause corrosion of metal in screws and cylinders during extrusion (hereinafter simply referred to as "corrosion of metal").

The content of the copper compound (B) in the polyamide resin composition according to the present embodiment is preferably 0.001 to 0.2% by mass, more preferably 0.005 to 0.15% by mass, further preferably 0.01 to 0.1% by mass, with respect to 100% by mass of the polyamide resin composition, i.e., the total mass of the polyamide resin composition.

If the content of the copper compound (B) in the polyamide resin composition falls within the range described above, the heat aging resistance tends to be able to be more significantly enhanced, and deposition of copper and corrosion of metal tends to be able to be effectively reduced.

The content of the copper element in the polyamide resin composition is preferably 0.001% by mass or more, more preferably 0.005% by mass or more, further preferably 0.005 to 0.05% by mass, still further preferably 0.007 to 0.03% by mass, with respect to 100% by mass of the polyamide resin composition, i.e., the total mass of the polyamide resin composition, from the viewpoint of enhancing the heat aging resistance of the polyamide resin composition.

(Bromide of Alkali Metal and/or Bromide of Alkaline Earth Metal (C))

The polyamide resin composition according to the present embodiment contains bromide of alkali metal and/or Bromide of alkaline earth metal (C) (hereinafter, also referred to as a component (C)).

Examples of the bromide of alkali metal and/or Bromide of alkaline earth metal (C) include, but are not limited to, potassium bromide, sodium bromide, lithium bromide, calcium bromide, and magnesium bromide, and mixtures thereof.

In particular, the component (C) is preferably potassium bromide and/or sodium bromide, more preferably potassium bromide, from the viewpoint of enhancing the heat aging resistance of the polyamide resin composition according to the present embodiment and suppressing corrosion of metal.

The content of the bromide of alkali metal and/or bromide of alkaline earth metal (C) in the polyamide resin composition according to the present embodiment is preferably 0.05 to 5% by mass, more preferably 0.1 to 2% by mass, further preferably 0.1 to 0.5% by mass, with respect to 100% by mass of the polyamide resin composition, i.e., the total mass of the polyamide resin composition.

If the content of the bromide of alkali metal and/or bromide of alkaline earth metal (C) is within the range described above, the heat aging resistance of the polyamide resin composition tends to be able to be more significantly enhanced, and deposition of copper and corrosion of metal tends to be able to be effectively reduced.

The copper compound (B) and the bromide of an alkali metal and/or bromide of an alkaline earth metal (C) are preferably contained in the polyamide resin composition according to the present embodiment at a molar ratio of the halogen element to the copper element (halogen element/ copper element) of preferably 2/1 to 50/1, more preferably 5/1 to 30/1, still more preferably 5/1 to 20/1.

If the content ratio (halogen element/copper element) is within this range, the heat aging resistance of the polyamide resin composition according to the present embodiment tends to be able to be more significantly enhanced.

Throughout the specification, the halogen element indicates the total of a halogen element derived from a copper halide, if the copper compound (B) is the copper halide, and a bromine element derived from the bromide of an alkali metal and/or bromide of an alkaline earth metal (C).

A molar ratio of the halogen element to the copper element (halogen element/copper element) of 2/1 or more tends to reduce deposition of copper and corrosion of metal effectively in the polyamide resin composition according to the present embodiment.

If the molar ratio (halogen element/copper element) is 50/1 or less, corrosion of screws and the like in molding machines tends to be able to be prevented without essentially impairing mechanical properties, such as toughness, of the polyamide resin composition according to the present embodiment.

(Phosphorus Compound (D))

The polyamide resin composition according to the present embodiment contains a phosphorus compound (D) (hereinafter, also referred to as a component (D)).

The phosphorus compound (D) is at least one compound selected from the group consisting of phosphite compounds represented by the following general formula (1), and phosphonite compounds represented by the following general formula (2):

$$\text{phosphite compound: } (RO)_m P(OH)_{3-m} \quad \text{general formula (1) and}$$

$$\text{phosphonite compound: } (RO)_n P(OH)_{2-n}(R) \quad \text{general formula (2)}$$

In the general formulas (1) and (2), m represents 1, 2, or 3, and n represents 1 or 2.

R represents an aliphatic group, an aromatic group, or a partially substituted aliphatic group or aromatic group.

If each of m and n is 2 or more, a plurality of (RO) groups in the general formulas (1) and (2) are the same or different from each other.

Examples of the group represented by R include, but are not limited to, aliphatic groups such as a methyl group, an ethyl group, a n-propyl group, a n-butyl group, a t-butyl group, a n-hexyl group, a cyclohexyl group, a n-octyl group, a nonyl group, a decyl group, a stearyl group, and an oleyl group; aromatic groups such as a phenyl group and a biphenyl group; and aliphatic groups or aromatic groups each having a substituent such as a hydroxyl group, a methyl group, an ethyl group, a propyl group, a butyl group, a methoxy group, or an ethoxy group.

The phosphorus compound (D) can be at least one compound selected from the group consisting of phosphite compounds represented by the general formula (1), and phosphonite compounds represented by the general formula (2). Examples thereof include, but are not limited to, tris(2,4-di-t-butylphenyl)phosphite, bis(2,4-di-t-butylphenyl)pentaerythritol diphosphite, bis(2,6-di-t-butyl-4-methylphenyl) pentaerythritol diphosphite, bis(2,4-dicumylphenyl) pentaerythritol diphosphite, 2,2',2"-nitrilo(triethyl-tris(3,3', 5,5'-tetra-t-butyl-1,1'-biphenyl-2,2'-diyl))phosphite, tetrakis(2,4-di-t-butylphenyl)-4,4'-biphenylene diphosphonite, tetrakis(2,4-di-t-butylphenyl)-4,3'-biphenylene diphosphonite, tetrakis(2,4-di-t-butylphenyl)-3,3'-biphenylene diphosphonate.

These phosphorus compounds (D) each can be used singly or can be used as a mixture of two or more thereof.

The content of the phosphorus compound (D) is preferably 0.01 to 10% by mass, more preferably 0.01 to 5% by mass, further preferably 0.03 to 2% by mass, with respect to 100% by mass of the polyamide resin composition according to the present embodiment, i.e., the total mass of the polyamide resin composition.

Within the range described above, there is a tendency to yield a polyamide resin composition that is much superior in the suppression of corrosion of metal and copper deposition.

The bromide of alkali metal and/or bromide of alkaline earth metal (C) [x] and the phosphorus compound (D) [y] are preferably contained in the polyamide resin composition according to the present embodiment such that the mass ratio [x/y] of the bromide of alkali metal and/or bromide of alkaline earth metal (C) to the phosphorus compound (D) (component (C)/component (D)) in the polyamide resin composition is 100/1 to 1/100, more preferably 50/1 to 1/50, further preferably 10/1 to 1/10, still further preferably 10/1 to 1/1.

If mass ratio of the component (C)/component (D) is within the range described above, there is a tendency to be able to further enhance the heat aging resistance of the polyamide resin composition according to the present embodiment and also to further suppress corrosion of metal and copper deposition.

(Other Components that can be Contained in Polyamide Resin Composition)
(Fatty Acid Compound (E))

The polyamide resin composition according to the present embodiment can further contain at least one fatty acid compound (E) selected from the group consisting of fatty acid esters, fatty acid amides, and fatty acid metal salts (hereinafter, also referred to as a fatty acid compound (E) or a component (E)) from the viewpoint of further enhancing heat aging resistance.

These fatty acid compounds each can be used singly or can be used in combination of two or more thereof.

The fatty acid constituting the fatty acid compound (E) indicates an aliphatic monocarboxylic acid.

Particularly, a fatty acid having 8 or more carbon atoms is preferred. A fatty acid having 8 to 40 carbon atoms is more preferred. Examples of the fatty acid include, but are not limited to, saturated or unsaturated linear or branched aliphatic monocarboxylic acids.

Examples of the fatty acid include, but are not limited to, stearic acid, palmitic acid, behenic acid, erucic acid, oleic acid, lauric acid, and montanic acid.

The fatty acid esters are ester compounds of the aforementioned fatty acid and an alcohol.

Examples of the alcohol include, but are not limited to, 1,3-butanediol, trimethylolpropane, stearyl alcohol, behenyl alcohol, and lauryl alcohol.

Examples of the fatty acid esters include, but are not limited to, stearyl stearate, behenyl behenate, montanic acid-1,3-butanediol ester, montanic acid-trimethylolpropane ester, trimethylolpropane trilaurate, and butyl stearate.

The fatty acid amides are amidated products of the aforementioned fatty acid.

Examples of the fatty acid amides include, but are not limited to, stearic acid amide, oleic acid amide, erucic acid amide, ethylene bisstearamide, ethylene bisoleamide, N-stearyl stearamide, and N-stearyl erucamide. Among these fatty acid amides, particularly, stearic acid amide, erucic acid amide, ethylene bisstearamide, and N-stearyl erucamide are preferred, and ethylene bis(stearamide) and N-stearyl erucamide are more preferred.

The fatty acid metal salts are metal salts of the aforementioned fatty acid.

Examples of the metal element that forms a salt with the fatty acid include group 1 elements (alkali metals) of the periodic table, group 2 elements (alkaline earth metals) of the periodic table, group 3 elements of the periodic table, zinc, and aluminum.

The metal element is preferably an alkali metal such as sodium and potassium; an alkaline earth metal such as calcium and magnesium; or aluminum.

Examples of the fatty acid metal salts include, but are not limited to, higher fatty acid metal salts such as calcium stearate, aluminum stearate, zinc stearate, magnesium stearate, calcium montanate, sodium montanate, aluminum montanate, zinc montanate, magnesium montanate, calcium behenate, sodium behenate, zinc behenate, calcium laurate, zinc laurate, and calcium palmitate.

Throughout the specification, the higher fatty acid is a fatty acid having more than 10 carbon atoms.

Among these fatty acid metal salts, a montanic acid metal salt, a behenic acid metal salt, and a stearic acid metal salt are preferably used. Particularly, calcium stearate, aluminum stearate, zinc stearate, magnesium stearate, calcium montanate, zinc montanate, magnesium montanate, calcium behenate, and zinc behenate are preferred. Aluminum stearate, zinc stearate, magnesium stearate, calcium montanate, zinc montanate, calcium behenate, and zinc behenate are more preferred. Calcium montanate, zinc montanate, and zinc behenate are further preferred.

These fatty acid metal salts each can be used singly or can be used in combination of two or more thereof.

If the fatty acid compound (E) is a fatty acid metal salt, this fatty acid metal salt is preferably a higher fatty acid metal salt with a metal content of 3.5 to 11.5% by mass. As a result, there is a tendency to yield a polyamide resin composition that is much superior in the suppression of corrosion of metal and copper deposition, appearance, and mold release properties. The metal content is more preferably 3.5 to 10.0% by mass, further preferably 4.0 to 9.0% by mass.

The fatty acid compound (E) preferably has an acid value determined in accordance with JIS K 0070 (the number of milligrams of potassium hydroxide needed to neutralize free fatty acids, resin acids etc., in a sample (1 g)) of 10 mg/g or less from the viewpoint of suppressing corrosion of metal and copper deposition by the polyamide resin composition according to the present embodiment. The acid value is more preferably 0.01 to 10 mg/g, further preferably 0.01 to 5 mg/g, still further preferably 0.01 to 3 mg/g, particularly preferably 0.01 to 1 mg/g.

The fatty acid compound (E) is preferably a fatty acid amide or a fatty acid metal salt from the viewpoint of further enhancing moldability and is more preferably a fatty acid metal salt, particularly, from the viewpoint of still further attaining a better appearance and higher mold release properties of the polyamide resin composition according to the present embodiment.

The melting point of the fatty acid compound (E) is preferably 110 to 150° C., more preferably 115 to 145° C., further preferably 115 to 140° C., from the viewpoint of still further attaining a better appearance and higher mold release properties of the polyamide resin composition according to the present embodiment.

The melting point of the fatty acid compound (E) can be determined by differential scanning calorimetry (DSC) or the like.

The content of the fatty acid compound (E) is preferably 0.01 to 10% by mass, more preferably 0.03 to 5% by mass, further preferably 0.05 to 2% by mass, with respect to 100% by mass of the polyamide resin composition according to the present embodiment, i.e., the total mass of the polyamide resin composition.

If the content of the fatty acid compound (E) is within the range described above, there is a tendency to yield a polyamide resin composition that is much superior in a better appearance, higher mold release properties, higher mechanical strength, and higher plasticity.

The ratio between the bromide of alkali metal and/or bromide of alkaline earth metal (C) and the fatty acid compound (E) contained in the polyamide resin composition according to the present embodiment is preferably 2/1 to 1/10, more preferably 2/1 to 1/5, further preferably 1/1 to 1/5, still further preferably 1/1 to 1/3, in terms of mass ratio of component (C)/component (E).

If the mass ratio of component (C)/component (E) is within the range described above, there is a tendency to be able to further enhance the heat aging resistance of the polyamide resin composition according to the present embodiment and also to still further suppress corrosion of metal and copper deposition.

(Inorganic Filler (F))

The polyamide resin composition according to the present embodiment can further contain an inorganic filler (F) (hereinafter, also referred to as a component (F)) in addition to the aforementioned components (A) to (D) and the component (E).

Examples of the inorganic filler (F) include, but are not limited to, glass fibers, carbon fibers, calcium silicate fibers, potassium titanate fibers, aluminum borate fibers, glass flakes, talc, kaolin, mica, hydrotalcite, calcium carbonate, zinc carbonate, zinc oxide, calcium monohydrogen phosphate, wollastonite, silica, zeolite, alumina, boehmite, aluminum hydroxide, titanium oxide, silicon oxide, magnesium oxide, calcium silicate, sodium aluminosilicate, magnesium silicate, ketjen black, acetylene black, farness black, carbon nanotubes, graphite, yellow copper, copper, silver, aluminum, nickel, iron, calcium fluoride, mica, montmorillonite, swellable fluorine mica, and apatite.

These inorganic fillers each can be used singly or can be used in combination of two or more thereof.

Among those mentioned above, at least one inorganic filler (F) selected from the group consisting of glass fibers, carbon fibers, glass flakes, talc, kaolin, mica, wollastonite, silica, carbon nanotubes, graphite, calcium fluoride, montmorillonite, swellable fluorine mica, and apatite is preferred from the viewpoint of enhancing the mechanical strength and rigidity of the polyamide resin composition according to the present embodiment.

The inorganic filler (F) is more preferably at least one inorganic filler selected from the group consisting of glass fibers, carbon fibers, wollastonite, talc, mica, kaolin, and silicon nitride.

The glass fibers and the carbon fibers in the polyamide resin composition preferably have a number average fiber diameter of 3 µm to 30 µm, a weight average fiber length of 100 µm to 750 µm, and an aspect ratio of the weight average fiber length to the number average fiber diameter (value obtained by dividing the weight average fiber length by the number average fiber diameter) of 10 to 100 to attain a polyamide resin composition having high mechanical properties.

The wollastonite in the polyamide resin composition preferably have a number average fiber diameter of 3 µm to 30 µm, a weight average fiber length of 10 µm to 500 µm, and an aspect ratio of 3 to 100 to attain a polyamide resin composition having high mechanical properties.

The talc, mica, kaolin, and silicon nitride in the polyamide resin composition preferably have a number average particle diameter of 0.1 µm to 3 µm to attain a polyamide resin composition having high mechanical properties.

Throughout the specification, the number average fiber diameter, the number average particle diameter, and the weight average fiber length can be determined by the following methods.

A polyamide resin composition is placed in an electric furnace to burn organic substances contained in the resin composition. For example, more than 100 inorganic fillers are arbitrarily selected from the residue, and are observed with a scanning electron microscope (SEM) to determine the fiber diameters and the particle diameters of these inorganic fillers, and in turn the number average fiber diameter and the number average particle diameter. The fiber lengths are measured with an SEM photograph at a magnification of 1000 times to determine the weight average fiber length.

The inorganic filler (F) may be subjected to a surface treatment with a silane coupling agent.

Examples of the silane coupling agent include, but not limited to, aminosilanes such as γ-aminopropyltriethoxysilane, γ-aminopropyltrimethoxysilane and N-β-(aminoethyl)-γ-aminopropylmethyldimethoxysilane; mercaptosilanes such as γ-mercaptopropyltrimethoxysilane and γ-mercaptopropyltriethoxysilane; expoxysilanes; and vinylsilanes.

The inorganic filler is preferably one or more inorganic fillers selected from the group above. More preferred are aminosilanes.

The glass fibers and the carbon fibers may further contain a sizing agent such as copolymers containing a carboxylic anhydride-containing unsaturated vinyl monomer and an unsaturated vinyl monomer excluding the carboxylic anhydride-containing unsaturated vinyl monomer as structural units, epoxy compounds, polycarbodiimide compounds, polyurethane resins, homopolymers of acrylic acid, copolymers of acrylic acid and other copolymerizable monomers, and salts of primary, secondary, and tertiary amines thereof. These can be used singly or in combinations of two or more thereof.

The glass fibers or the carbon fibers can be obtained, for example, by continuous reaction using the aforementioned sizing agent in a glass fiber or carbon fiber production process known in the art.

Specifically, the sizing agent is applied to glass fibers or carbon fibers using a method known in the art such as a roller-type applicator, and the fiber strand thus produced can be dried to obtain the glass fibers or the carbon fibers mentioned above.

The fiber strand may be used directly as a roving or nay be used as a chopped glass strand through a further cutting step.

The sizing agent is applied (added) to the glass or carbon fibers (100% by mass) in a solid content of preferably 0.2 to 3% by mass, more preferably 0.3 to 2% by mass.

The solid content in the sizing agent to be added is preferably 0.2% by mass or more based on 100% by mass of the glass or carbon fibers to maintain sizing of the glass or carbon fibers. The amount of the sizing agent to be added in terms of the solid content is preferably 3% by mass or less to enhance the thermal stability of the polyamide resin composition according to the present embodiment. The strands may be dried after the cutting step, or may be cut after drying the strands.

In the case of using the inorganic filler (F) in the polyamide resin composition according to the present embodiment, the content of the inorganic filler (F) in the polyamide resin composition is preferably 10 to 70% by mass, more preferably 15 to 65% by mass, further preferably 20 to 65% by mass, from the viewpoint of enhancing moldability and mechanical strength.

(Additional Component)

The polyamide resin composition according to the present embodiment may further contain an additional component, if necessary, without impairing the effects of the present invention, in addition to the aforementioned components (A) to (F).

Examples of the additional component that can be added to the polyamide resin composition include, but are not limited to, secondary amine compounds, antioxidants, ultraviolet absorbers, heat stabilizers, light degradation inhibitors, plasticizers, lubricants, mold release agents, nucleating agents, flame retardants, colorants, dyeing agents, and pigments. Alternatively, other thermoplastic resins can be mixed therewith.

Examples of the secondary amine compounds include, but are not limited to, aromatic secondary amine compounds and hindered amine light stabilizers (HALS). Particularly, an aromatic secondary amine compound is preferred from the viewpoint of the suppression of metal corrosive properties and the mechanical strength of the polyamide resin composition.

These additional components largely differ in their properties. Therefore, their preferred contents that hardly impair the effects according to the present embodiment vary among these components. Those skilled in the art can readily set the respective preferred contents of these additional components.

[Method for Producing Polyamide Resin Composition]

The method for preparing the polyamide resin composition according to the present embodiment can be, but is not limited to, a method of melting the polyamide resin (A) in a mono- or multi-axial extruder, and kneading the component (B), the component (C), and the component (D) with the melted polyamide resin (A).

If the inorganic filler (F) is used, a twin screw extruder provided with an upstream feeding port and a downstream feeding port is preferably used to feed the inorganic filler (F) from the downstream feeding port for melt kneading after feeding the polyamide resin (A), the component (B), the component (C), and the component (D) and optionally, the component (E) from the upstream feeding port and melting. If a roving of glass or carbon fibers is used, a composite product can be prepared by a known method.

[Characteristics of Polyamide Resin Composition]

Preferably, the polyamide resin composition according to the present embodiment does not cause the deposition of the copper element on the surface of a rolled steel (SS400) if the polyamide resin composition is in contact with the rolled steel for 12 hours at a temperature of 30° C. plus the melting point of the polyamide resin (A).

The polyamide resin composition according to the present embodiment containing the phosphorus compound (D) tends to be able to effectively suppress copper deposition. The polyamide resin composition according to the present embodiment containing the fatty acid compound (E) having an acid value of 10 mg/g or less tends to be able to more effectively suppress copper deposition.

The copper deposition of the polyamide resin composition according to the present embodiment can be tested by a method described in Examples mentioned later.

The molded article according to the present embodiment comprises the aforementioned polyamide resin composition according to the present embodiment and can be produced, for example, by the injection molding of the polyamide resin composition.

[Applications]

The molded article according to the present embodiment can be suitably used as various molded articles and parts, for example, for vehicles, industrial machines, electric and electronic apparatuses and devices, trade and industrial materials, and daily household goods.

EXAMPLES

Hereinafter, the present invention will be described in detail with reference to specific Examples and Comparative Examples. However, the present invention is not intended to be limited by these Examples.

[Methods for Evaluation]

Hereinafter, methods for evaluation conducted in Examples and Comparative Examples will be described.

<Tensile Strength>

Pellets of the polyamide resin compositions prepared in Examples and Comparative Examples were molded into multi-purpose test pieces (A type) with an injection molding machine (PS-40E: made by NISSEI PLASTIC INDUSTRIAL CO., LTD.) by a method in accordance with ISO 3167.

In molding, the time for injection and hold-pressure was set at 25 seconds, the cooling time at 15 seconds, the mold temperature at 80° C., and a melt resin temperature at 290° C.

The prepared multi-purpose test pieces (A type) were subjected to a tensile test at a tensile rate of 5 mm/min by a method in accordance with ISO 527 to determine the tensile strength (MPa).

<Tensile Strength after Heat Aging>

The multi-purpose test pieces (A type) prepared in the evaluation of tensile strength above were thermally aged in a hot air circulating oven at 150° C. for 2,000 hours.

These test pieces were cooled at 23° C. for 24 hours, and were subjected to a tensile test at a tensile rate of 5 mm/min by a method in accordance with ISO 527 to determine the tensile strength (MPa) after heat aging for 2,000 hours.

<Corrosion of Metal>

20 g of pellets of the polyamide resin compositions prepared in Examples and Comparative Examples were each placed in an autoclave made of SUS314 and having pressure resistance to 2.0 MPa and an inner volume of 100 mL. A rolled steel (SS400) test piece (10 mm×20 mm×2 mm) having a surface polished with a #2000 whetstone were then added, and additional pellets (20 g) of the polyamide resin composition were deposited over the rolled steel test piece.

The autoclave was purged with nitrogen, and was hermetically sealed. The polyamide resin compositions were heated at 290° C. for 12 hours.

The autoclave was then cooled under running water to room temperature, and was opened.

The rolled steel test piece was extracted from the melt and solidified pellets of the polyamide resin compositions. The polyamide resin composition adhering to the surface of the rolled steel test piece was removed with hexafluoropropanol (HFIP). The mass of the rolled steel test piece was precisely weighed in order of 0.01 mg, and was divided by the predetermined mass of the rolled steel test piece before the test to determine the mass reduction rate in mass ppm.

<Copper Deposition>

The surface of the rolled steel test specimen was observed after the aforementioned corrosion of metal test, and the deposition status of the copper element was visually observed and evaluated as follows:

A: No deposition of the copper element was observed.

B: The deposition of the copper element was less than 5% of the surface area of the rolled steel.

C: The deposition of the copper element was 5% or more and less than 10% of the surface area of the rolled steel.

D: The deposition of the copper element was 10% or more of the surface area of the rolled steel.

[Preparation of Raw Material]

(1. Polyamide Resin)

(1-1) Polyamide 66 (Hereinafter, Referred to as "PA-1")

VN (sulfuric acid): 143 mL/g,
Terminal amino group: 48 mmol/kg,
Terminal carboxylic acid group: 79 mmol/kg,
Melting point: 260° C.

(1-2) Polyamide 66 (Hereinafter, Referred to as "PA-2")

VN (sulfuric acid): 140 mL/g,
Terminal amino group: 80 mmol/kg,
Terminal carboxylic acid group: 46 mmol/kg,
Melting point: 260° C.

(2. Copper Iodide (Hereinafter, Referred to as "CuI"))

A reagent manufactured by Wako Pure Chemical Industries, Ltd. was used.

(3. Potassium Bromide (Hereinafter, Referred to as "KBr"))

A reagent manufactured by Wako Pure Chemical Industries, Ltd. was used.

(4. Potassium Iodide (Hereinafter, Referred to as "KI"))

A reagent manufactured by Wako Pure Chemical Industries, Ltd. was used.

(5. Phosphorus Compound)

(5-1) Bis(2,6-Di-t-Butyl-4-Methylphenyl)Pentaerythritol Diphosphite PEP-36 (Hereinafter, Referred to as "PEP-36"), which is A product manufactured by ADEKA Corp. was used.

(5-2) Tetrakis(2,4-Di-t-Butylphenyl)-4,4'-Biphenylene Diphosphonite P-EPQ (Hereinafter, Referred to as "P-EPQ")

A product manufactured by Clariant (Japan) K.K. was used.

(6. Fatty Acid Compound)

(6-1) Calcium Montanate (Hereinafter, Referred to as "MonCa")

Acid value: 0.8 mg/g, Melting point: 120° C.

(6-2) Ethylene Bis(Stearamide) (Hereinafter, Referred to as "EBS")

Acid value: 8 mg/g, Melting point: 140° C.

(6-3) Zinc Stearate (Hereinafter, Referred to as "StZn")

Acid value: 0.5 mg/g, Melting point: 120° C.

(6-4) Aluminum Monostearate (Hereinafter, Referred to as "StAl")

Acid value: 14 mg/g, Melting point: 170° C.

(7. Inorganic Filler (Glass Fibers: Hereinafter, Referred to as "GF"))

Trade name: ECS 03T-275H (manufactured by Nippon Electric Glass Co., Ltd.)

[Examples 1 to 12] and [Comparative Examples 1 to 5]

The extruder used was a twin-screw extruder [ZSK-26MC; manufactured by Coperion GmbH (Germany)] having an upstream feed port in the first barrel on the upstream side and a downstream feed port in the 9th barrel, and having L/D (Length of the cylinder of the extruder/Diameter of the cylinder of the extruder) of 48 (the number of barrels: 12).

In this twin-screw extruder, the temperature from the upstream feed port to the die was set to 280° C., the number of screw revolutions was set to 250 rpm, and the discharge rate was set to 25 kg/hr.

Under these conditions, the polyamide resin (PA), CuI, KBr or KI, the phosphorus compound, and the fatty acid compound were supplied from the upstream feed port, while GF was supplied from the downstream feed port as to Examples 10 and 11 so as to attain the ratios described in the upper boxes of Tables 1 to 3 below.

The mixture was melt-kneaded to produce pellets of a polyamide resin composition.

The obtained polyamide resin composition was molded at the aforementioned melted resin temperature and mold temperature, and the molded piece was evaluated for tensile strength, tensile strength after heat aging, corrosion of metal, and copper deposition.

These evaluation (measurement) results, etc., are shown in Tables 1 to 3 below.

TABLE 1

|  |  |  |  | Example 1 | Example 2 | Example 3 | Example 4 | Example 5 | Example 6 |
|---|---|---|---|---|---|---|---|---|---|
| <Composition> | | | | | | | | | |
| (A) Polyamide resin | PA-1 | part by mass | | 99.2 | 99.05 | 98.3 | 98.3 | | 99.05 |
|  | PA-2 | part by mass | | | | | | 98.3 | |
| (B) Copper iodide | CuI | part by mass | | 0.03 | 0.05 | 0.1 | 0.1 | 0.1 | 0.05 |
| (C) Potassium bromide | KBr | part by mass | | 0.17 | 0.3 | 0.6 | 0.6 | 0.6 | 0.3 |
| Potassium iodide | KI | part by mass | | | | | | | |
| (D) Phosphorus compound | PEP-36 | part by mass | | 0.1 | 0.1 | 0.2 | 0.2 | 0.2 | |
|  | P-EPQ | part by mass | | | | | | | 0.1 |
| (E) Fatty acid compound | MonCa | part by mass | | | | 0.8 | | | |
|  | EBS | part by mass | | 0.5 | 0.5 | | | | 0.5 |
|  | StZn | part by mass | | | | | 0.8 | 0.8 | |
|  | StAl | part by mass | | | | | | | |
| (F) Inorganic filler | GF | part by mass | | | | | | | |
| <Physical properties> | | | | | | | | | |
| Tensile strength | | MPa | | 86 | 85 | 86 | 86 | 86 | 85 |
| Tensile strength after heat aging | | MPa | | 84 | 82 | 85 | 85 | 85 | 83 |
| Metal corrosive property | Rate of decrease in mass | ppm | | 68 | 80 | 46 | 50 | 51 | 80 |
| Copper deposition | | — | | B | B | A | A | A | B |

TABLE 2

| | | | Example 7 | Example 8 | Example 9 | Example 10 | Example 11 | Example 12 |
|---|---|---|---|---|---|---|---|---|
| <Composition> | | | | | | | | |
| (A) Polyamide resin | PA-1 | part by mass | 98.3 | 98.3 | 98.3 | 98.3 | 64.05 | 64.05 |
| | PA-2 | part by mass | | | | | | |
| (B) Copper iodide | CuI | part by mass | 0.1 | 0.1 | 0.1 | 0.1 | 0.05 | 0.05 |
| (C) Potassium bromide | KBr | part by mass | 0.6 | 0.6 | 0.6 | 0.6 | 0.3 | 0.3 |
| Potassium iodide | KI | part by mass | | | | | | |
| (D) Phosphorus | PEP-36 | part by mass | | | | 0.1 | 0.2 | 0.1 |
| compound | P-EPQ | part by mass | 0.2 | 0.2 | 0.1 | | | 0.1 |
| (E) Fatty acid compound | MonCa | part by mass | 0.8 | | 0.8 | | | 0.5 |
| | EBS | part by mass | | | | | | |
| | StZn | part by mass | | 0.8 | | | 0.5 | |
| | StAl | part by mass | | | | 0.8 | | |
| (F) Inorganic filler | GF | part by mass | | | | | 35 | 35 |
| <Physical properties> | | | | | | | | |
| Tensile strength | | MPa | 86 | 86 | 86 | 85 | 210 | 208 |
| Tensile strength after heat aging | | MPa | 85 | 85 | 86 | 82 | 210 | 208 |
| Metal corrosive property | Rate of decrease in mass | ppm | 52 | 50 | 45 | 89 | 62 | 65 |
| Copper deposition | | — | A | A | A | C | A | A |

TABLE 3

| | | | Comparative Example 1 | Comparative Example 2 | Comparative Example 3 | Comparative Example 4 | Comparative Example 5 |
|---|---|---|---|---|---|---|---|
| <Composition> | | | | | | | |
| (A) Polyamide resin | PA-1 | part by mass | 99.65 | 99.15 | 98.3 | 99.15 | 99.15 |
| | PA-2 | part by mass | | | | | |
| (B) Copper iodide | CuI | part by mass | 0.05 | 0.05 | 0.1 | 0.05 | 0.05 |
| (C) Potassium bromide | KBr | part by mass | 0.3 | 0.3 | 0.6 | | |
| Potassium iodide | KI | part by mass | | | | 0.3 | 0.3 |
| (D) Phosphorus compound | PEP-36 | part by mass | | | | | 0.1 |
| | P-EPQ | part by mass | | | | | |
| (E) Fatty acid compound | MonCa | part by mass | | | | | |
| | EBS | part by mass | | 0.5 | | 0.5 | 0.5 |
| | StZn | part by mass | | | 0.8 | | |
| | StAl | part by mass | | | | | |
| (F) Inorganic filler | GF | part by mass | | | | | |
| <Physical properties> | | | | | | | |
| Tensile strength | | MPa | 82 | 84 | 84 | 85 | 84 |
| Tensile strength after heat aging | | MPa | 65 | 80 | 81 | 72 | 71 |
| Metal corrosive property | Rate of decrease in mass | ppm | 130 | 201 | 143 | 65 | 66 |
| Copper deposition | | — | C | D | D | A | A |

First, how to see Tables 1 to 3 will be described.

Higher tensile strength indicates better mechanical strength.

Higher tensile strength after heat aging indicates particularly better heat aging resistance.

A smaller rate of decrease in mass in the corrosion of metal test indicates that metal corrosive properties are more effectively suppressed.

As shown in Table 1, in Examples 1 to 12, a polyamide resin composition having high heat aging resistance, well-balanced and excellent suppression of corrosion of metal and copper deposition, and favorable heat stability was obtained by use of the phosphorus compound.

Particularly, Examples 1 to 9, 11, and 12 supplemented with the fatty acid compound having an acid value of 10 mg/g or less further suppressed metal corrosive properties and copper deposition and were thus found favorable.

On the other hand, Comparative Example 1 free from the phosphorus compound and the fatty acid compound was shown to be inferior in heat aging resistance.

Comparative Examples 2 and 3 containing the fatty acid compound but free from the phosphorus compound were shown to be inferior in metal corrosive properties or copper-depositing properties, though heat aging resistance was excellent.

The comparison of Example 2 with Comparative Example 2, Comparative Example 4, and Comparative Example 5 demonstrated that metal corrosive properties or copper-depositing properties are not influenced by the addition of the phosphorus compound in the case of using potassium iodide without the use of potassium bromide, whereas metal corrosive properties and copper-depositing properties can be effectively suppressed by the addition of the phosphorus compound in the case of using potassium bromide.

These results demonstrated that the polyamide resin composition of the present invention is high heat aging resistance and can effectively suppress corrosion of metal and copper deposition.

INDUSTRIAL APPLICABILITY

The polyamide resin composition of the present invention is industrially applicable as a material for molded products required to have high levels of mechanical physical properties, such as vehicle parts and various electronic parts.

The invention claimed is:

1. A polyamide resin composition comprising:
   30 to 99.94% by mass of a polyamide resin (A),
   0.001 to 0.2% by mass of a copper compound (B),
   0.05 to 5% by mass of a bromide of an alkali metal and/or a bromide of an alkaline earth metal (C),
   at least one phosphorus (D) compound selected from the group consisting of tris(2,4-di-t-butylphenyl)phosphite, bis(2,4-di-t-butylphenyl)pentaerythritol diphosphite, bis(2,6-di-t-butyl-4-methylphenyl)pentaerythritol diphosphite, bis(2,4-dicumylphenyl)pentaerythritol diphosphite, 2,2',2"-nitrilo(triethyl-tris(3,3',5,5'-tetra-t-butyl-1,1'-biphenyl-2,2'-diyl))phosphite, tetrakis(2,4-di-t-butylphenyl)-4,4'-biphenylene diphosphonite, tetrakis(2,4-di-t-butylphenyl)-4,3'-biphenylene diphosphonite, and tetrakis(2,4-di-t-butylphenyl)-3,3'-biphenylene diphosphonate, in an amount of 0.01 to 10% by mass with respect to 100% by mass of the polyamide resin composition,
   at least one fatty acid compound (E) selected from the group consisting of fatty acid esters, fatty acid amides, and fatty acid metal salts, in an amount of 0.01 to 10% by mass with respect to 100% by mass of the polyamide resin composition, and
   10 to 70% by mass of an inorganic filler (F).

2. The polyamide resin composition according to claim 1, wherein the copper compound (B) is a copper halide compound.

3. The polyamide resin composition according to claim 1, wherein a molar ratio of a halogen element/a copper element in the polyamide resin composition is 2/1 to 50/1.

4. The polyamide resin composition according to claim 1, wherein the fatty acid compound (E) has an acid value of 10 mg/g or less.

5. The polyamide resin composition according to claim 1, wherein the fatty acid compound (E) is a higher fatty acid metal salt with a metal content of 3.5 to 11.5% by mass.

6. The polyamide resin composition according to claim 1, wherein the content of the copper element in the polyamide resin composition is 0.005% by mass or more with respect to the total mass of the polyamide resin composition.

7. The polyamide resin composition according to claim 1, wherein the mass ratio [x/y] of the bromide of alkali metal and/or bromide of alkaline earth metal (C) [x] to the phosphorus compound (D) [y] contained in the polyamide resin composition is 100/1 to 1/100.

8. The polyamide resin composition according to claim 1, wherein the polyamide resin composition does not cause the deposition of the copper element on the surface of a rolled steel (SS400) after the polyamide resin composition is in contact with the rolled steel at a temperature 30° C. higher than the melting point of the polyamide resin (A) for 12 hours.

9. A molded article comprising a polyamide resin composition according to claim 1.

10. The molded article according to claim 9, wherein the molded article is a vehicle part.

11. The polyamide resin composition according to claim 1, wherein the inorganic filler (F) is selected from the group consisting of glass fibers, carbon fibers, glass flakes, talc, kaolin, mica, wollastonite, silica, carbon nanotubes, graphite, calcium fluoride, montmorillonite, swellable fluorine mica, and apatite.

* * * * *